United States Patent
Tsai et al.

(10) Patent No.: US 9,853,317 B2
(45) Date of Patent: Dec. 26, 2017

(54) BILAYER COMPLEX PROTON EXCHANGE MEMBRANE AND MEMBRANE ELECTRODE ASSEMBLY

(71) Applicant: Industrial Technology Research Institute, Hsinchu (TW)

(72) Inventors: Li-Duan Tsai, Hsinchu (TW); Chiu-Ping Huang, Hsinchu (TW); Li-Fu Huang, Taoyuan County (TW); Shih-Wen Chen, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 667 days.

(21) Appl. No.: 13/674,964

(22) Filed: Nov. 13, 2012

(65) Prior Publication Data

US 2014/0004445 A1 Jan. 2, 2014

(30) Foreign Application Priority Data

Jun. 29, 2012 (TW) .............................. 101123481 A

(51) Int. Cl.
*H01M 8/10* (2016.01)
*H01M 8/1027* (2016.01)
(Continued)

(52) U.S. Cl.
CPC ......... *H01M 8/1027* (2013.01); *H01M 8/103* (2013.01); *H01M 8/1023* (2013.01);
(Continued)

(58) Field of Classification Search
None
See application file for complete search history.

(56) References Cited

U.S. PATENT DOCUMENTS

| 7,022,810 | B1 | 4/2006 | Cornelius |
| 7,371,480 | B2 | 5/2008 | Ono et al. |

(Continued)

FOREIGN PATENT DOCUMENTS

| TW | 200808435 | 2/2008 |
| TW | 201103183 | 1/2011 |
| TW | 201123597 | 7/2011 |

OTHER PUBLICATIONS

Tseng et al. Sulfonated Polyimide Proton Exchange Membranes with Graphene Oxide show Improved Proton Conductivity, Methanol Crossover Impedance, and Mechanical Properties. Oct. 2011. Advanced Energy Materials. vol. 1, Issue 6. pp. 1220-1224.*

(Continued)

*Primary Examiner* — Sarah A. Slifka
*Assistant Examiner* — Haroon S. Sheikh
(74) *Attorney, Agent, or Firm* — JCIPRNET

(57) ABSTRACT

A bilayer complex proton exchange membrane and a membrane electrode assembly are provided. The bilayer complex proton exchange membrane includes a first complex structure and a second complex structure. The first complex structure includes 0.001-10 wt % of a graphene derivative with two dimension configuration, and 99.999-90 wt % of organic material. The organic material includes polymer material having sulfonic acid group or phosphate group. The second complex structure includes 0.5-30 wt % of inorganic material and 99.5-70 wt % of organic material, wherein a surface area of the inorganic material is 50-3000 $m^2/g$, and the organic material includes polymer material with sulfonic acid group or phosphate group.

10 Claims, 2 Drawing Sheets

(51) Int. Cl.
H01M 8/1023 (2016.01)
H01M 8/1025 (2016.01)
H01M 8/103 (2016.01)
H01M 8/1032 (2016.01)
H01M 8/1039 (2016.01)
H01M 8/1046 (2016.01)
B82Y 30/00 (2011.01)

(52) U.S. Cl.
CPC ....... H01M 8/1025 (2013.01); H01M 8/1032 (2013.01); H01M 8/1039 (2013.01); H01M 8/1046 (2013.01); B82Y 30/00 (2013.01)

(56) References Cited

U.S. PATENT DOCUMENTS

| | | | |
|---|---|---|---|
| 2005/0233183 A1 | 10/2005 | Hampden-Smith et al. | |
| 2007/0092777 A1* | 4/2007 | Zhamu et al. | 429/33 |
| 2011/0160319 A1* | 6/2011 | Tsai et al. | 521/27 |
| 2012/0172461 A1 | 7/2012 | Tsai et al. | |
| 2013/0065154 A1* | 3/2013 | Lee | H01M 8/1051 429/465 |

OTHER PUBLICATIONS

Wu et al. Preparation and characterization of graphene/CdS nanocomposites. Nov. 2010. Applied Surface Science. vol. 257, Issue 3. pp. 747-751.*

Tseng, Sulfonated Polyimide Proton Exchange Membranes with Graphene Oxide show Improved Proton Conductivity, Methanol Crossover Impedance, and Mechanical Properties, Oct. 4, 2011, Advanced Energy Materials, vol. 1, Issue 6, pp. 1220-1224.*

Machine Translation of TW201103183.*

Tung et al., "Surfactant-Free Water-Processable Photoconductive All-Carbon Composite," Journal of the American Chemical Society, 2011, pp. 4940-4947.

Ho-Da Jiang, "Effect of sulfonic acid groups on properties of new organic/inorganic semi-interpenetrating network proton exchange membrane," Master's thesis, Apr. 2008, Department of Applied Chemistry, National Chiao Tung University.

"Office Action of Taiwan Counterpart Application", dated Dec. 9, 2014, p. 1-p. 4, in which the listed references were cited.

Alonso et al., "Nafion-Clay Nanocomposite Membranes: Morphology and Properties," Polymer 50 (11), May 22, 2009, pp. 1-27.

Cao et al., "A poly(ethylene oxide)/graphene oxide electrolyte membrane for low temperature polymer fuel cells," Journal of Power Sources 196, Oct. 15, 2011, pp. 8377-8382.

Kongkachuichay et al., "Nafion/Analcime and NafionlFaujasite composite membranes for polymer electrolyte membrane fuel cells," Chemical Engineering Research and Design 88, Apr. 2010, pp. 495-500.

Holmberg et al., "Nanocomposite fuel cell membranes based on Nafion and acid functionalized zeolite beta nanocrystals," Journal of Membrane Science 320, Jul. 15, 2008, pp. 86-92.

Takimoto et al., "Conductive area ratio of multiblock copolymer electrolyte membranes evaluated by e-AFM and its impact on fuel cell performance," Journal of Power Sources 194, Dec. 1, 2009, pp. 662-667.

Qi Ma, "A Study on Graphene Oxide Nanocomposite Membrane," Chinese Master's Theses Full-text database Engineering Science and Technology I, vol. 8, Aug. 31, 2009.

"Office Action of China Counterpart Application," dated Apr. 7, 2015, p. 1-p. 7, in which the listed references were cited.

* cited by examiner

BILAYER COMPLEX PROTON EXCHANGE MEMBRANE AND MEMBRANE ELECTRODE ASSEMBLY

CROSS-REFERENCE TO RELATED APPLICATION

This application claims the priority benefit of Taiwan application serial no. 101123481, filed on Jun. 29, 2012. The entirety of the above-mentioned patent application is hereby incorporated by reference herein and made a part of this specification.

TECHNICAL FIELD

The technical field relates to a bilayer complex proton exchange membrane and a membrane electrode assembly (MEA).

BACKGROUND

The membrane electrode assembly of a micro fuel cell, which uses high concentration methanol vapor as fuel, encounters numerous challenges. First of all, the high concentration methanol crossover to the cathode results in poisoning the cathode catalyst or resulting in the potential drop. Second, the high concentration methanol feed leads to a lack of key reactant water. Thus the membrane electrode assembly must have water retention. A thinner proton exchange membrane is more favorable for anode water retention and proton conduction. However, the methanol crossover problem becomes even more serious as the thickness of a proton exchange membrane reduces.

To resolve these two critical problems of high concentration methanol crossover and lack of water, the proton exchange membrane must encompass the characteristics of low crossover permeability of methanol and water retention.

The current proton exchange membrane Nafion (a perfluorosulphonic acid resin) forms micro-structures of ion clusters easily. Although these ion clusters are beneficial for proton conduction, but lack of water at high temperature and the problem of methanol crossover are incurred. Hence, Nafion can not be operated under the conditions of high methanol concentration and high-temperature and low humidification. Regarding the perfluorosulphonic acid resin (PFSA) series of proton exchange membrane due to the relationship between humidity, resulting in severe decline of the electrical conductivity, the MEA impedance increased substantially, which led to the MEA performance and durability is poor.

SUMMARY

One of exemplary embodiments comprises a bilayer complex proton exchange membrane that includes a first complex structure and a second complex structure. The first complex structure includes 0.001 wt % to 10 wt % of a graphene derivative with a two-dimensional structure and 99.999 wt % to 90 wt % of an organic material. The organic material in the first complex structure includes a first polymer material with a sulfonic acid group and a phosphate group. The second complex structure includes 0.5 wt % to 30 wt % of an inorganic material and 99.5 wt % to 70 wt % of an organic material. The surface area of the inorganic material in the second complex structure is 50 $m^2$/g to 3000 $m^2$/g. The organic material is the second complex structure includes a polymer material with a sulfonic acid group and a phosphate group.

Another one of exemplary embodiments comprises a membrane electrode assembly (MEA) including the above bilayer complex proton exchange membrane, wherein the MEA includes an anode, the bilayer complex proton exchange membrane, and a cathode.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
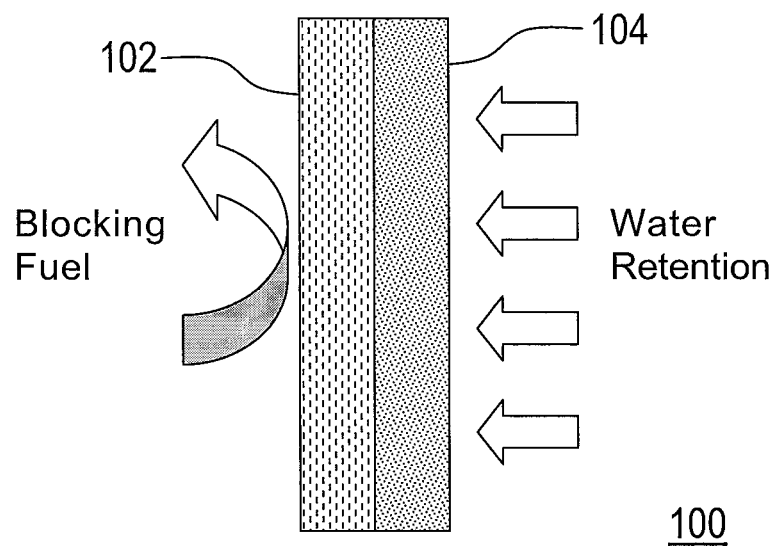
FIG. 1 is a schematic, cross-sectional view diagram of a bilayer complex proton exchange membrane according to a first exemplary embodiment of the disclosure.

FIG. 1 is a schematic, cross-sectional view diagram of a bilayer complex proton exchange membrane according to a first exemplary embodiment of the disclosure.

Referring to FIG. 1, a bilayer complex proton exchange membrane of the first exemplary embodiment includes a first complex structure 102 and a second complex structure 104. The first complex structure 102 and the second complex structure 104 are laminated together, for example by coating, to form a film.

The first complex structure includes 0.001 wt % to 10 wt % of a two-dimensional graphene derivative (2D-structure) and 99.999 wt % to 90 wt % of an organic material. The first complex structure belongs to a type of organic-inorganic hybrid complex structure. The organic material, referred hereinafter as "organic material (1)", may include a polymer material with a sulfonic acid group or a phosphate group.

The above graphene derivate includes, for example, graphene oxide, graphene sulfide, graphene hydroxide, graphene carbonate, graphene nitride or graphene sulfonate. When the graphene derivate is graphene oxide, its content in the first complex structure is between 0.001 wt % to 5 wt %, for example. When the graphene derivate is graphene sulfide, its content in the first complex structure is between 0.001 wt % to 5 wt %, for example.

The organic material (1), such as a polymer material with a sulfonic acid group or a phosphate group, may include, for example, PTFE-PFSA copolymer or sulfonated hydrocarbon polymer. The sulfonated hydrocarbon polymer includes sulfonated polyether ether ketone (s-PEEK), sulfonated polyimides (s-PI), sulfonated poly (phenylene oxide) (s-PPO), sulfonated poly(arylene ether sulfone) (s-PES), or sulfonated poly (4-phenoxybenzoyl-1,4-phenylene) (s-PPBP), for example.

The second complex structure includes, for example, 0.5 wt % to 30 wt % of an inorganic material and 99.5 wt % to 70 wt % of an organic material. The second complex structure is also a type of organic-inorganic hybrid complex structure, wherein the organic material, referred hereinafter as "organic material (2)", includes a polymer material with a sulfonic acid group or a phosphate group.

The surface area of the inorganic material is between about 50 m$^2$/g to 3000 m$^2$/g. Further, the content of the inorganic material in the second complex structure is about 0.5 wt % to about 20 wt %.

The inorganic material, for example a carbon material such as activated carbon, mesoporous carbon, nanoshell, nanosheet, nanohorn, amorphous carbon or crystalline carbon, etc. It is to be understood that the above examples are presented by way of example and not by way of limitation. Any organic material, functionable as a proton exchange membrane of a micro fuel cell and has a surface area falls within the above surface area range, can be applied in the exemplary embodiment of the disclosure.

The organic material (2) is a polymer material with a sulfonic acid group, such as perfluorosulphonic acid resin, sulfonated polyether ether ketone (s-PEEK), sulfonated polyimides (s-PI), sulfonated poly (phenylene oxide) (s-PPO), sulfonated poly(arylene ether sulfone) (s-PES), or sulfonated poly(4-phenoxybenzoyl-1,4-phenylene) (s-PPBP).

The organic material (2) is a polymer material with a phosphate group, for example, a phosphate doped polybenzimidazole polymer.

Further, if the organic material (1) and the organic material (2) are the same materials, bur also enhance the adhesion of the first complex structure 102 and the second complex structure 103.

The following disclosure includes experimental results attained according to the implementation of the exemplary embodiments of the disclosure.

Experiment 1
Raw Materials:
(1) graphene oxide aqueous solution (GO$_{(aq)}$)
(2) inorganic water-retaining carbon material
(3) Nafion dispersion: a. DE2020 solution manufactured by Dupont Company (applicable in a water/alcohol system); b. H$^+$ Nafion DMAc dispersion (applicable in an organic solvent system).

The weight percents of above GO and inorganic water-retaining carbon material are summarized in the Table 1 below.

TABLE 1

|  | GO$_{(aq)}$ (wt %) | Inorganic water-retaining carbon material (wt %) |
| --- | --- | --- |
| Example 1 | 0.2 | 5 |
| Example 2 | 0.1 | 10 |
| Example 3 | 0.1 | 15 |
| Example 4 | 0.1 | 10 (sulfonated) |

Physical Properties Measurements:

Room temperature conductivity (rt, full RH), water volume swelling ratio, water uptake, MeOH crossover permeability are measured, and the results are summarized in Table 2 below.

TABLE 2

|  | NR212* | Example 1 | Example 2 | Example 3 | Example 4 |
| --- | --- | --- | --- | --- | --- |
| Conductivity (s/cm) | 0.0455 | 0.0455 | 0.050 | 0.041 | 0.052 |
| Water Volume Swelling Ratio (%) | 66.0 | 43.2 | 51.2 | 56.2 | 47.8 |
| Water Uptake (%) | 29.7 | 65.1 | 73.5 | 80.4 | 75.1 |
| MeOH Crossover Permeability (cm$^2$/s) | $1.57 \times 10^{-6}$ | $1.18 \times 10^{-6}$ | $1.34 \times 10^{-6}$ | $6.02 \times 10^{-7}$ | $8.28 \times 10^{-7}$ |

*NR212 is a commercial product of Nafion ®

According to the results presented in Table 2, the physical properties of the bilayer complex proton exchange membranes fabricated according to examples 1 to 4 are better than those of NR212. In detail, the bilayer complex proton exchange membranes in examples 1 to 4 can block fuel crossover, with a certain degree of high water-retention capacity and lower water swelling ratio, thereby providing a longer duration of action to effectively enhance the stability of the proton exchange membrane.

Figure 2:
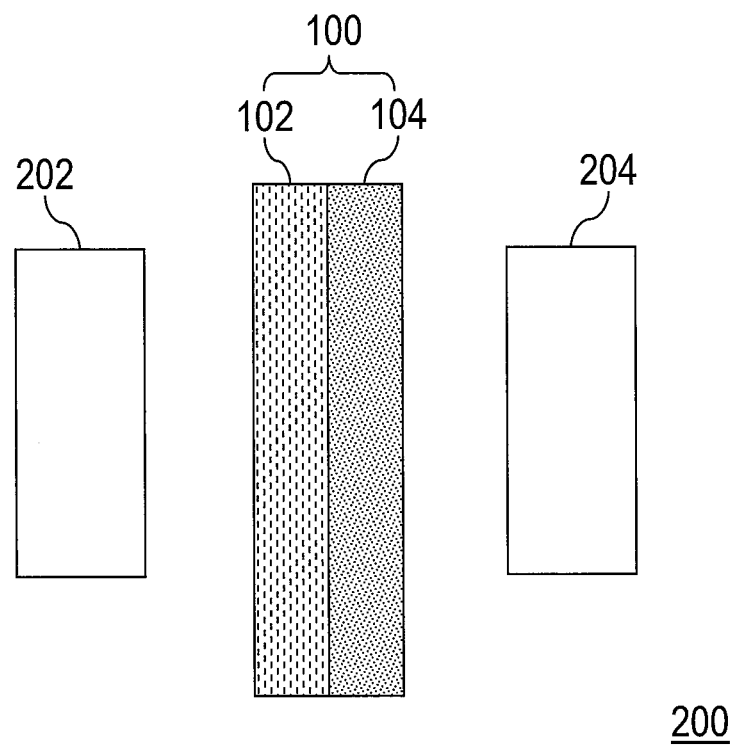
FIG. 2 is a membrane electrode assembly (MEA) according to a second exemplary embodiment of the disclosure.

FIG. 2 is a membrane electrode assembly (MEA) according to a second exemplary embodiment of the disclosure. In FIG. 2, the membrane electrode assembly 200 includes an anode 202, a bilayer complex proton exchange membrane and a cathode 204. In the second embodiment, the bilayer complex proton exchange membrane, for example, the first embodiment of the bilayer complex proton exchange membrane 100 and therefore the material selection and the composition ratio can be with reference to the first embodiment. The bilayer complex proton exchange membrane has functions of inhibiting methanol crossover to the cathode, and with water retained. The anode 202 can choose to use the platinum ruthenium (PtRu) catalyst, and the cathode 204 is optionally selected to use the platinum (Pt) catalyst The anode 202 and cathode 204 are presented by way of examples and not by way of limitation.

Experiment 2

The bilayer complex proton exchange membrane 100 of the first exemplary embodiment with high proton conductivity, can inhibit the methanol crossover to the cathode. When the anode 202 is a platinum ruthenium (PtRu) catalyst electrode, the cathode 204 is a platinum (Pt) catalyst electrode. The membrane electrode assembly 200 can be obtained by the sequence of a anode, a bilayer complex proton exchange membrane obtained from the example 1, and a cathode by hot-pressed.

Further, in the same manner to a anode, a bilayer complex proton exchange membrane obtained from the example 4, and a cathode composed another membrane electrode assembly.

Figure 3:
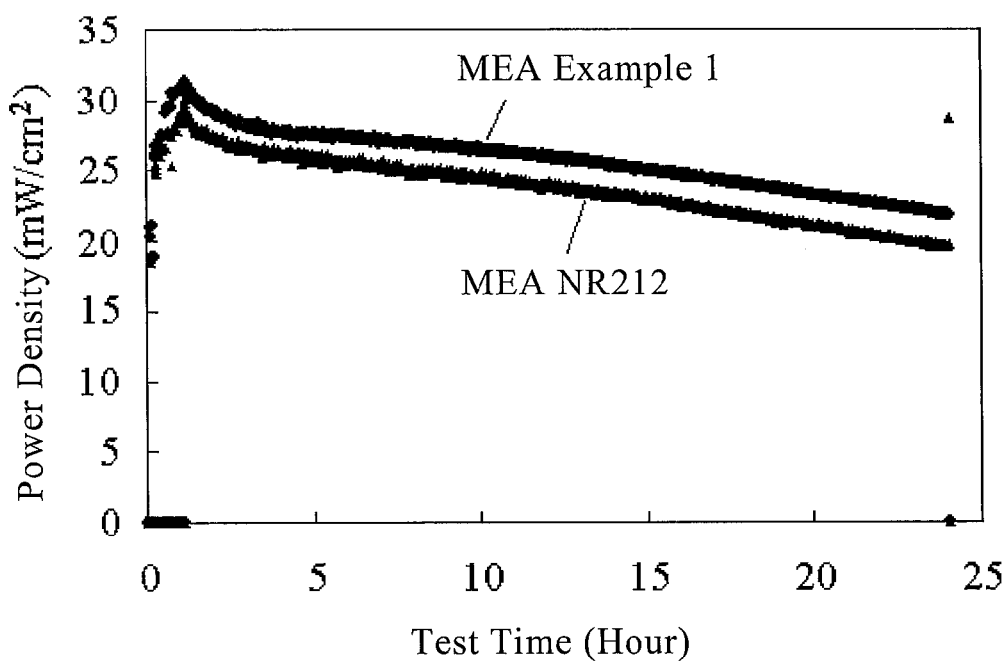
FIG. 3 is a diagram illustrating the comparison results in Experiment 2, in which the properties between membrane electrode assembly using the bilayer complex proton exchange membrane of example 1 and the membrane electrode assembly using the commercial proton exchange membrane NR212 are compared.

Under room temperature, the performance are compared with the membrane electrode assembly using the bilayer complex proton exchange membrane of example 1 and using the commercial proton exchange membrane NR212 by anode with pure methanol vapor (100% MeOH vapor) feed, and cathode with ambient air feed. The results are illustrated in FIG. 3. The fuel consumption rate and the energy efficiency are compared and the results are presented in Table 3.

TABLE 3

| MEA | Actual amount/ Theoretical amount of methanol consumption | Actual amount/ Theoretical amount of water consumption | Output power Wh | Energy efficiency % |
|---|---|---|---|---|
| MEA NR212 | 1.57 | −0.28 | 6.84 | 19.9 |
| MEA Example 1 | 1.43 | −0.25 | 7.38 | 21.7 |

Figure 4:
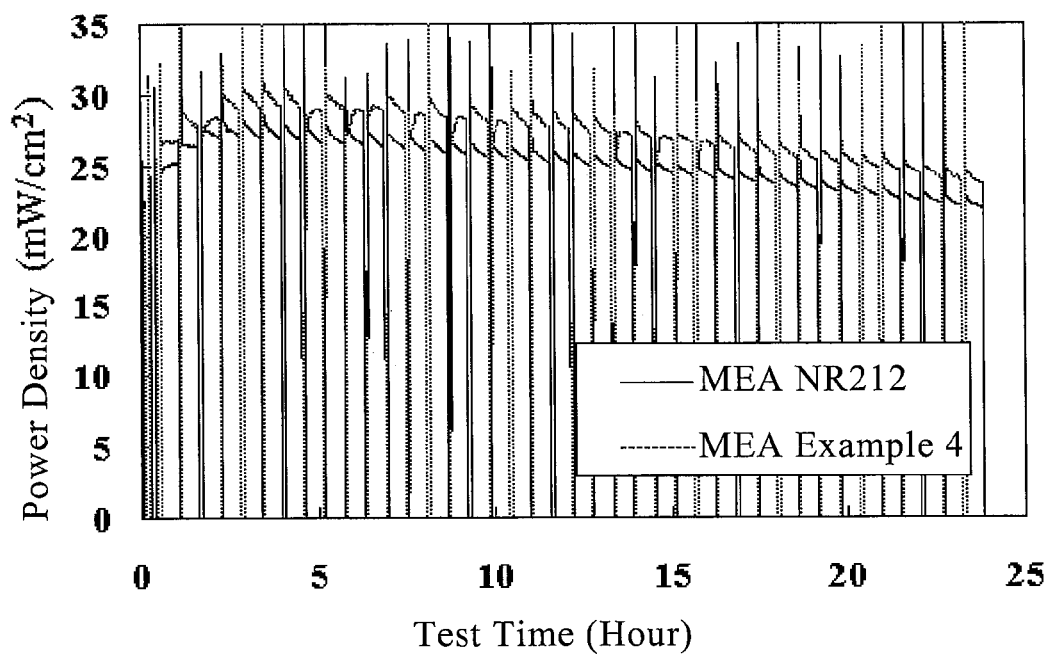
FIG. 4 is a diagram illustrating the comparison results in Experiment 2, in which the properties between membrane electrode assembly using the bilayer complex proton exchange membrane of example 4 and the membrane electrode assembly using the commercial proton exchange membrane NR212 are compared.

Under room temperature, the performance are compared with the membrane electrode assembly using the bilayer complex proton exchange membrane of example 4 and using the commercial proton exchange membrane NR212 by anode with pure methanol vapor (100% MeOH vapor) feed, and cathode with ambient air feed. The results are illustrated in FIG. 4. The fuel consumption rate and the energy efficiency are compared and the results are also summarized in Table 4.

TABLE 4

| MEA | Actual amount/ Theoretical amount of methanol consumption | Actual amount/ Theoretical amount of water consumption | Output power Wh | Energy efficiency % |
|---|---|---|---|---|
| MEA NR212 | 1.59 | −0.27 | 6.31 | 19.4 |
| MEA Example 4 | 1.50 | −0.26 | 6.76 | 20.7 |

According to the above results, the MEA with bilayer complex proton exchange membranes of example 1 and example 4 are preferred over the MEA with the commercial proton exchange membrane NR212 in micro DMFC design.

In summary, the bilayer complex proton exchange membranes or MEA of the disclosure are up to the expected efficacy, and better than the commercial products.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A bilayer complex proton exchange membrane, included in a membrane electrode assembly, consists of:

a first complex structure near an anode of the membrane electrode assembly, comprising:
0.001 wt % to 0.2 wt % of graphene oxide; and 99.999 wt % to 90 wt % of a first organic material that includes a PTFE-PFSA copolymer; and a second complex structure laminated to the first complex structure, and the second complex structure is near a cathode of the membrane electrode assembly, wherein the second complex structure comprises:
0.5 wt % to 30 wt % of an inorganic material, wherein a surface area of the inorganic material is 50 $m^2/g$ to 3000 $m^2/g$; and
99.5 wt % to 70 wt % of a second organic material that includes a second polymer material with the sulfonic acid group or the phosphate group.

2. The bilayer complex proton exchange membrane of claim 1, wherein the inorganic material in the second complex structure comprises a carbon material.

3. The bilayer complex proton exchange membrane of claim 2, wherein the carbon material includes activated carbon, mesoporous carbon nanoshell, nanosheet, nanohorn, amorphous carbon or crystalline carbon.

4. A membrane electrode assembly comprising the bilayer complex proton exchange membrane of claim 3, the membrane electrode assembly comprising the anode, the bilayer complex proton exchange membrane, and the cathode.

5. A membrane electrode assembly comprising the bilayer complex proton exchange membrane of claim 2, the membrane electrode assembly comprising the anode, the bilayer complex proton exchange membrane, and the cathode.

6. The bilayer complex proton exchange membrane of claim 1, wherein the second organic material in the second complex structure comprises perfluorosulphonic acid resin, sulfonated polyether ether ketone (s-PEEK), sulfonated polyimides (s-PI), sulfonated poly (phenylene oxide) (s-PPO), sulfonated poly(arylene ether sulfone) (s-PES), or sulfonated poly (4-phenoxybenzoyl-1,4-phenylene) (s-PPBP).

7. A membrane electrode assembly comprising the bilayer complex proton exchange membrane of claim 6, the membrane electrode assembly comprising the anode, the bilayer complex proton exchange membrane, and the cathode.

8. The bilayer complex proton exchange membrane of claim 1, wherein the second organic material in the second complex structure comprises a phosphate doped polybenzimidzole polymer.

9. A membrane electrode assembly comprising the bilayer complex proton exchange membrane of claim 8, the membrane electrode assembly comprising the anode, the bilayer complex proton exchange membrane, and the cathode.

10. A membrane electrode assembly comprising the bilayer complex proton exchange membrane of claim 1, the membrane electrode assembly comprising the anode, the bilayer complex proton exchange membrane, and the cathode.

* * * * *